United States Patent
Jeong et al.

(10) Patent No.: US 7,317,760 B2
(45) Date of Patent: Jan. 8, 2008

(54) SYSTEM AND METHOD FOR FINGER AND PATH MANAGEMENT IN RECEIVERS

(75) Inventors: Gibong Jeong, San Diego, CA (US); David Blake Woodall, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 740 days.

(21) Appl. No.: 10/716,957

(22) Filed: Nov. 19, 2003

(65) Prior Publication Data
US 2005/0105599 A1 May 19, 2005

(51) Int. Cl.
*H04L 27/28* (2006.01)
(52) U.S. Cl. ............ 375/260; 375/142; 375/149; 375/343; 375/349; 370/332; 370/365; 455/52.3; 455/67.1; 455/135
(58) Field of Classification Search ............ 375/140, 375/141–143, 149, 150, 260, 343, 349; 370/320, 370/332, 342, 441, 464, 465, 479, 329; 455/52.3, 455/65, 67.1, 134, 135
See application file for complete search history.

(56) References Cited

U.S. PATENT DOCUMENTS

| | | | |
|---|---|---|---|
| 6,370,183 B1 | 4/2002 | Newson et al. | 375/144 |
| 6,795,422 B2 | 9/2004 | Ohsuge | 370/342 |
| 6,977,955 B2 | 12/2005 | Tamura | 375/144 |
| 7,039,097 B2 | 5/2006 | Terao | 375/148 |
| 2002/0181488 A1 | 12/2002 | Okazaki et al. | |
| 2004/0063420 A1 | 4/2004 | Hayata | |

*Primary Examiner*—Dac V. Ha
(74) *Attorney, Agent, or Firm*—Ronald O. Neerings; Wade James Brady, III; Frederick J. Telecky, Jr.

(57) ABSTRACT

System and method for managing finger and path resources. A preferred embodiment comprises receiving a delay profile, processing paths from the delay profile, placing the processed paths into a plurality of sets based on path criteria, and assigning the placed processed paths to demodulating fingers. A preferred embodiment further comprises the use of historical information on paths in the placing.

45 Claims, 6 Drawing Sheets

SYSTEM AND METHOD FOR FINGER AND PATH MANAGEMENT IN RECEIVERS

TECHNICAL FIELD

The present invention relates generally to a system and method for digital wireless communications, and more particularly to a system and method for management of finger and path resources in a wireless communications receiver.

BACKGROUND

In wireless communications systems, copies of a transmitted signal arriving at a receiver can cause problems with the receiver's ability to accurately decode the transmitted signal. The multiple copies of the transmitted signal arriving at the receiver may be caused by reflections of the transmitted signal arriving at the receiver at different times due to different distances traveled by the different reflections. This phenomenon is commonly referred to as multipath.

In a receiver of a spread spectrum communications system, the individual paths in the multipath can often be combined to help improve the signal quality of the received signal and therefore improve the probability of accurately decoding the information received. This can be accomplished by the use of a rake receiver, which has a plurality of fingers, wherein each one of the fingers can be assigned to track an individual path of the multipath, to demodulate a version of the received signal (the received signal from each finger may be slightly different due to distortion induced by reflections) from the assigned path in the multipath. The various versions of the received signal demodulated by the fingers may then be combined to produce a single received signal that may be of better quality than any single received signal from any one of the individual paths.

However, since in many applications, receivers are placed in small wireless devices, resources (such as the number of fingers in a rake receiver, overall processing power, and so forth) can be limited due to size, power, and cost constraints. Additionally, improper assignment of fingers to paths can result in multiple fingers being assigned to the same path. This may arise from the assignment of fingers to paths that are too close to one another, and then, through timing adjustments, one (or more) of the fingers moving closer and closer to a single path until all involved fingers are demodulating the same path.

Furthermore, the operating environment for a wireless device can rapidly change due to movement of the wireless device. The changes in the operating environment can change the number and the position of the individual paths in the multipath. The receiver needs to be able to detect the changes in the paths and make changes to the finger assignments in a timely manner. Therefore, the management of the finger resources (i.e., assigning fingers to paths, determining which paths to demodulate and which paths to ignore, and so on) can be a vital factor in the overall performance of the receiver.

One prior art technique continuously monitors the strength of the path and allocates fingers to a path if its strength is greater than a specified threshold. Another prior art technique compares the strength of various paths and can either allocate a finger to the strongest path or change an assignment for a finger from an existing path to the strongest path. Yet another prior art technique maintains a time separation between fingers by not permitting a timing adjustment that can result in a spacing between fingers that is less than permitted.

One disadvantage of the prior art is that the continuous monitoring of the paths and their strengths may require a large bank of correlators or a matched filter to perform the monitoring. The continuous operation of the large bank of correlators or a matched filter may consume a large amount of power, which can reduce the battery life of a wireless device.

A second disadvantage of the prior art is that the comparison of the strengths of the various paths and the allocation of a finger to demodulate the strongest path does not perform well in the presence of a fading channel.

SUMMARY OF THE INVENTION

These and other problems are generally solved or circumvented, and technical advantages are generally achieved, by preferred embodiments of the present invention which provides for a system and method for managing finger resources in a receiver.

In accordance with a preferred embodiment of the present invention, a method comprising receiving a delay profile, processing paths from the delay profile, placing the processed paths into a plurality of sets based on path criteria, and assigning the placed processed paths to demodulating fingers is provided.

In accordance with another preferred embodiment of the present invention, a method comprising receiving demodulating finger strength measurements, filtering the demodulating finger strength measurements, processing demodulating finger assignments, checking drop timers for the demodulating finger assignments, and ensuring demodulating finger separation is provided.

In accordance with another preferred embodiment of the present invention, a receiver comprising a path searcher coupled to a signal input, the path searcher containing circuitry to provide a delay profile for a received signal from the signal input, a rake receiver coupled to the signal input, the rake receiver containing circuitry to demodulate the received signal at specified delay offsets and to combine demodulated signals at various offsets into a single received signal, and a resource manager coupled to the path searcher and the rake receiver, the resource manager to assign demodulating fingers in the rake receiver to demodulate specific paths based on information from the delay profile and to update the demodulating finger assignments when changes in the specific paths are detected is provided.

An advantage of a preferred embodiment of the present invention is that demodulation performance in the presence of a rapidly changing environment can be achieved without requiring a searcher with a large throughput. Additionally, the present invention does not require a significant increase in computational power, therefore, not requiring an upgrade in the processing element of a receiver. In general, a less powerful processing element can consume less power than a more powerful processing element. Leading to (in wireless applications) a smaller, less powerful, and less expensive battery or longer battery life.

A further advantage of a preferred embodiment of the present invention is that its use of a history can permit the receiver to save configurations for certain operating conditions which may be used at a later time. The saved history information can permit the receiver the ability to rapidly reconfigure its hardware resources for an adequate level of performance to ensure that an existing connection is not dropped. After ensuring that the connection is not dropped, the receiver can have time to optimize the performance of the connection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a code-division multiple access (CDMA) spread spectrum receiver, such as TIA/EIA-95 and CDMA2000 compliant systems. The TIA/EIA-95 technical standard is published in a document entitled "Mobile Station-Base Station Compatibility Standard for Wideband Spread Spectrum Cellular Systems (ANSI/TIA/EIA-95-B-99)," published Feb. 1, 1999, which is herein incorporated by reference. An overview of the CDMA2000 technical standard is provided in a document entitled "Introduction to CDMA2000 Spread Spectrum Systems, Release 0," which is herein incorporated by reference. The invention may also be applied, however, to receivers for other wireless communications systems wherein multipath signals can be combined after demodulation by a device such as a rake receiver. An example of such a receiver would be one for use in a UMTS (Universal Mobile Telephony System) compliant wireless communications system. An overview of the UMTS technical standard is provided in a document entitled "$3^{rd}$ Generation Partnership Project; Technical Specifications Group Services and System Aspects General UMTS Architecture," which is herein incorporated by reference.

Figure 1:
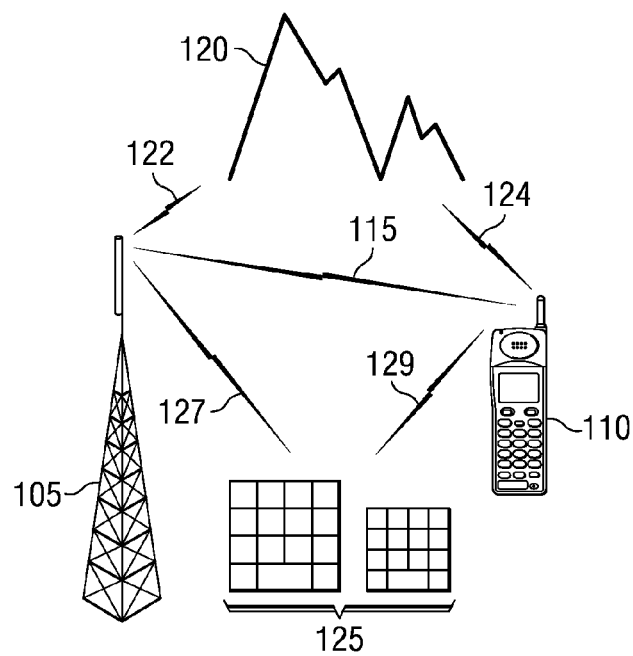
FIG. 1 is a diagram of a wireless communications system in an exemplary operating environment.

With reference now to FIG. 1, there is shown a diagram illustrating a wireless communications system in an exemplary operating environment. The wireless communications system includes a base station 105 and a wireless device 110, which may be a wireless telephone, a network interface, an information terminal, a multimedia device, and so forth. The wireless device 110 may be communicating with the base station 105 via a wireless connection 115. Note that while the wireless connection 115 is typically a bi-directional connection, the discussion will focus mainly on the downlink side (from the base station 105 to the wireless device 110). However, in addition to receiving transmissions from the base station 105 via the wireless connection 115, the wireless device 110 may also be receiving copies of the transmission.

Since wireless links are usually not directional (or only partially directional), a transmission over a wireless link can actually propagate over a large area. In the wireless communication system's operating environment, there may be large objects, such as hills (or mountains) 120 and buildings 125. These large objects can reflect the transmissions from the base station 105. In many cases, the reflected transmission can be received by the wireless device 110. For example, a portion of the transmission over the wireless link 115 (shown in FIG. 1 as a virtual wireless link 122) may be reflected off the hill 120 and be received by the wireless device 110 on a second virtual wireless link 124. Similarly, the transmission may also reach the wireless device 110 over a fourth virtual wireless link 129 after reflecting off buildings 125 (shown originating from the base station 105 as a third virtual wireless link 127). Note that the first, second, third, and fourth virtual wireless links 122, 124, 127, and 129 are used to illustrate how a transmission from the base station 105 to the wireless device 110 may propagate in directions not originally intended and reflect off objects in the operating environment.

The transmission over the wireless link 115 can be a direct transmission (a term that can be used to refer to the transmission over the wireless link 115) from the base station 105 to the wireless device 110. This means that the transmission received over the wireless link 115 most likely traveled the shortest distance. The reflections of the transmission that reach the wireless device 110 over virtual wireless links 124 and 129, for example, likely traveled a longer distance to reach the wireless device 110. As such, these reflected transmissions will arrive at the wireless device 110 later than the direct transmission. As discussed above, when multiple copies of a transmission arrive at a receiver, multipath is said to be present, with each received copy being referred to as a path.

Multipath can distort the signal received by the wireless device 110 since the multiple copies of the transmission may trample over one another. However, if the individual paths can be separated and the transmission extracted from each path and then combined together, the resulting received signal can be better than the received signal from the direct transmission alone. This can be due to the fact that when the various copies of the received signal are combined, the signal-to-noise ratio may be better since the combined received signal includes transmission energy that is not present in the received signal from the direct transmission case.

In receivers expressly designed to operate in multipath conditions, hardware can be present to provide a delay spread estimate. The delay spread estimate can provide a "map" of the various paths being received by the wireless device 110. For example, the delay spread estimate can tell the wireless device 110 the location of the various paths and their time offsets (in real time units or in code offsets). The delay spread estimation can then be used to assign fingers of a rake receiver to specific paths.

Figure 2:
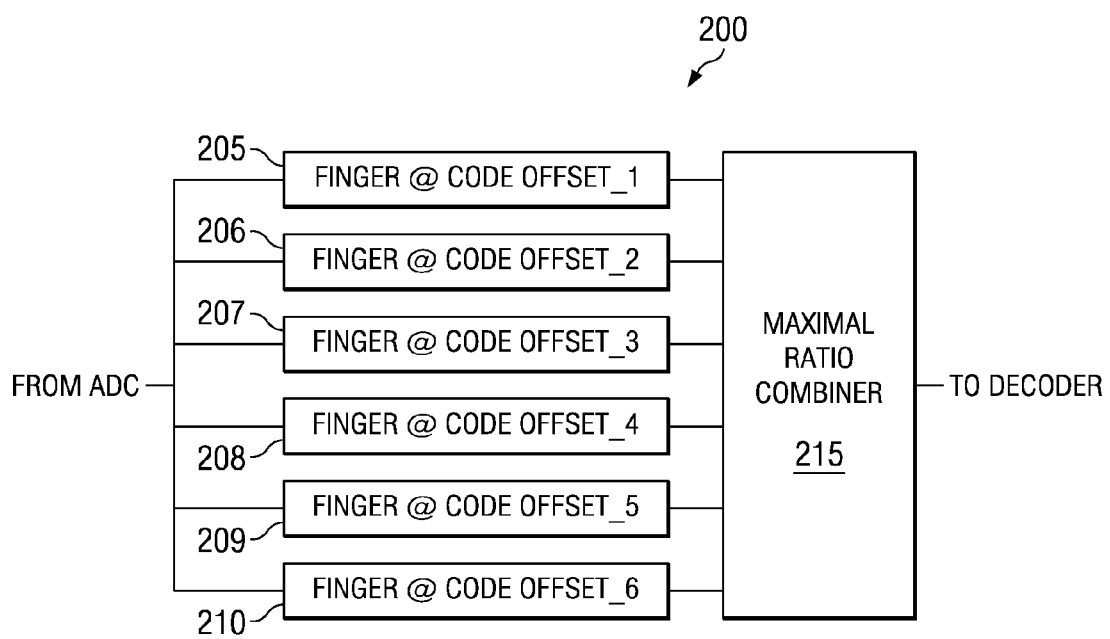
FIG. 2 is a diagram of a portion of a rake receiver.

With reference now to FIG. 2, there is shown a diagram illustrating a portion of a rake receiver 200, which can be a part of a receiver in a wireless communications network. As discussed above, the rake receiver 200 can have a plurality of fingers (for example, fingers 205 through 210), wherein each finger can demodulate a signal at an assigned code offset. Each of the fingers may be provided with a received signal, typically in digital form, from an analog-to-digital converter (ADC) (not shown). Note that each of the fingers can be provided with the same received signal. For each finger, the code offset can be different, resulting in each finger demodulating a different signal. If provided with the same code offset, then two different fingers can produce the same demodulated signal. Therefore, it can be the task of a finger manager to ensure that each finger is provided with a different code offset.

The demodulated signal produced by each of the fingers may be provided to a maximal ratio combiner 215 wherein the different demodulated signals can be combined into a single signal. The maximal ratio combiner 215 can combine the demodulated signals provided by the different fingers based upon an assigned weight given to the different demodulated signals. A demodulated signal with a large weight can be given more significance in a combining process than a demodulated signal with a small weight. For example, a demodulated signal that represents what may be thought of as originating from the direct transmission path can be given a larger weight than a demodulated signal that represents what may be originating from a path that has a large delay (possibly indicating that the signal has traveled a large distance and has been greatly attenuated). The weight given to the different demodulated signals can be thought of as assigning a level of significance to each of the demodulated signals.

There may be other ways to combine the different demodulated signals produced by the fingers. For example, the different demodulated signals may be given an equivalent weight (this can be essentially the same as putting no weight on any of the demodulated signals). By giving each demodulated signal the same weight, then each demodulated signal has equal significance. This technique is commonly referred to as equal gain combining. Alternatively, the different demodulated signals can be assigned a weight based on their relative distance from the path representing the direct transmission. This technique places significance on paths traveling shorter distances.

Figure 3:
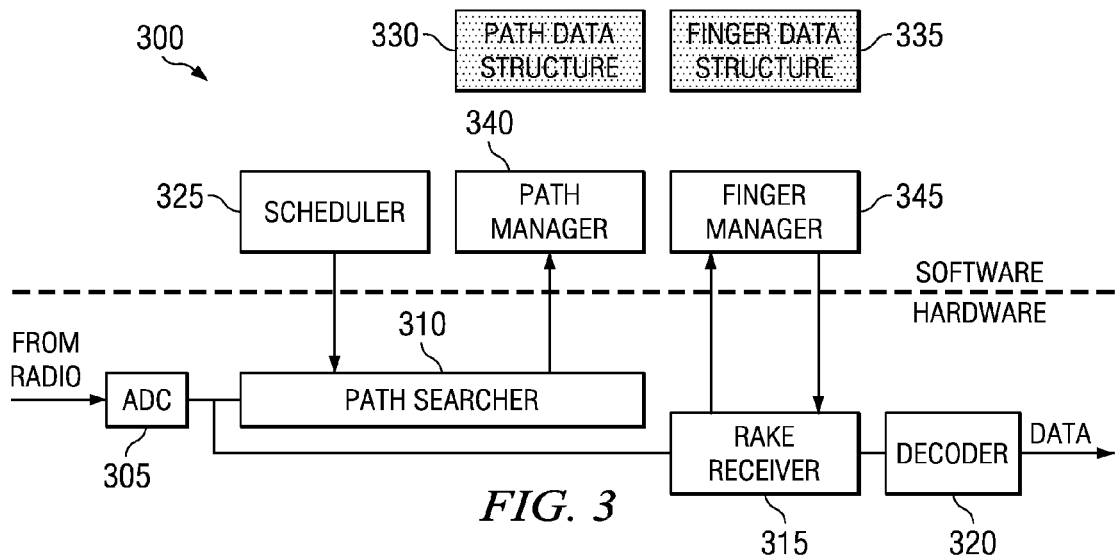
FIG. 3 is a diagram of a rake receiver resource management system, according to a preferred embodiment of the present invention.

With reference now to FIG. 3, there is shown a diagram illustrating a rake receiver resource management system 300 for a receiver, according to a preferred embodiment of the present invention. The rake receiver management system 300 can be partitioned into hardware and software components. The hardware components of the rake receiver management system 300 can include portions of a wireless receiver, such as an analog-to-digital converter (ADC) 305, a path searcher 310, a rake receiver 315, and a decoder 320.

The hardware components of the rake receiver management system 300 may be considered as typical components of a receiver that can be found in a wide variety of different receivers. It is through the interactions that the hardware components have with the software components of the rake receiver management system 300 that permit efficient management of scarce resources in the receiver, in general, and the rake receiver 315, in particular.

The software components of the rake receiver management system 300 can include a scheduler 325 that can basically be used to manage the operation of the path searcher 310, which can include the testing of hypotheses for use in system acquisition and finding pilot channels from base stations operating in the area. Results from the searches performed by the path searcher 310 (which may have been scheduled by the scheduler 325) can be provided to a path manager 340. The path manager 340 can be used to maintain a history of the delay profile of the signal received from a base station. The delay profile history can be used to assist in the allocation of fingers from the rake receiver 315. A path data structure 330 may be used to store the delay profile history. Note that the path data structure 330 may be a memory (random access memory (RAM), for example) and that it may be its own dedicated memory (not shown) or a portion of a larger memory unit (not shown). According to a preferred embodiment of the present invention, the delay profiles can be stored in discrete form, wherein information representing the actual paths is stored. The storage of information pertaining to the actual paths in a discrete form can reduce the storage requirements, which can reduce the size of the path data structure 330. Alternatively, a continuous delay profile can be stored in the path data structure 330.

The rake receiver 315, which can be used to demodulate copies of the transmitted signal that arrive at the receiver at different times due to multipath, can report indicators such as finger signal quality indicators (such as signal strength and signal-to-interference ratio) to a finger manager 345. Based on the finger signal quality indicators provided by the rake receiver 315 and in conjunction with searcher measurements from the path manager 340, the finger manager 345 can add, drop, or replace finger assignments. In general, the finger manager 345 controls the resources of the rake receiver 315. The finger manager 345 can also maintain a history of finger signal quality indicators in a finger data structure 335. Like the path data structure 330, the finger data structure 335 can be a memory, either its own dedicated memory (not shown) or a portion of a larger memory unit (not shown). The history of the finger indicators can be used to test the temporal statistics of the finger quality.

Figure 4:
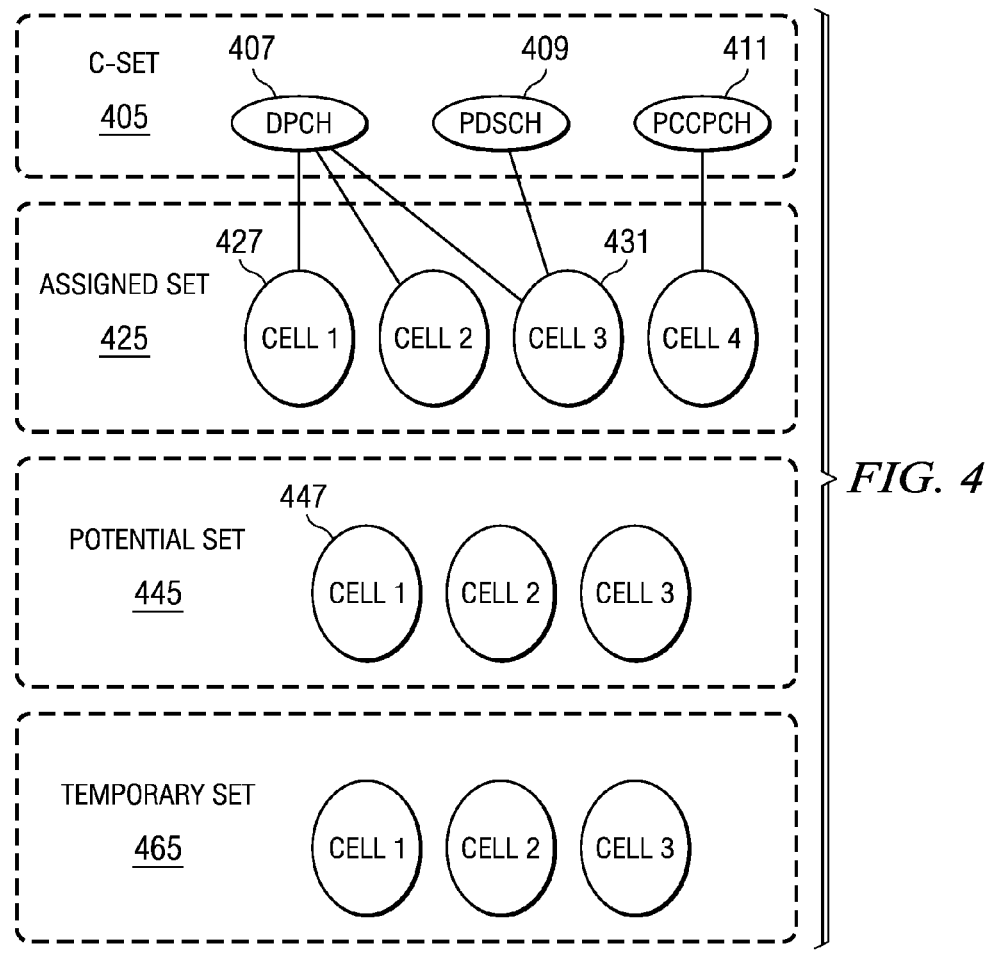
FIG. 4 is a diagram of different sets of paths, according to a preferred embodiment of the present invention.

With reference now to FIG. 4, there is shown a diagram illustrating different sets of paths, according to a preferred embodiment of the present invention. Paths provided to a path manager, such as the path manager 340 (FIG. 3) can be assigned into different sets (path sets) according to their strength and consistency. As discussed above, the paths can be provided to the path manager 340 by the path searcher 310 (FIG. 3). According to a preferred embodiment of the present invention, the paths provided to the path manager 340 can be placed into one of four sets: a CCTrCH set (Code Composite Transport Channel set, or C-set) 405, an assigned set 425, a potential set 445, and a temporary set 465.

The C-set 405 contains paths that may have been assigned to a finger for use in demodulating a CCTrCH, such as a dedicated physical channel (DPCH) (illustrated as a DPCH set 407), a physical downlink shared channel (PDSCH) (illustrated as a PDSCH set 409), a primary common control physical channel (PCCPCH) (illustrated as a PCCPCH set 411), and so on. A C-set may be thought of as a list of pointers to paths in the assigned set 425. For example, as illustrated in FIG. 4, the set of pointers representing the DPCH (DPCH set 407) may contain three pointers into the assigned set 425, wherein each pointer can represent a path.

The assigned set 425 contains paths that may be currently assigned to fingers for one or more CCTrCHs. As illustrated in FIG. 4, the paths of the assigned set 425 can be grouped based on a transmitting cell site (or base station). For example, a group CELL_1 427 can contain paths that are currently assigned to fingers that originated from cell site #1. A group can contain more than one path for more than one CCTRCH. For example, a group CELL_3 431 can contain paths from cell site #3 that are being demodulated for a DPCH and a PDSCH. Note that the finger manager 345 (FIG. 3) makes the assignments for the fingers; it can be responsible for modifying the assigned set 425.

The potential set 445 contains paths that may not be currently assigned to any finger, but may be of sufficient signal quality and can be qualified for demodulation. Again, the paths in the potential set 445 may be grouped based on the transmitting cell site. For example, group CELL#1 447 can contain paths from cell site #1. The temporary set 465 contains paths that may be under observation for promotion into the potential set 445. Members of the temporary set 465 may be provided after processing of the path searcher 310 (FIG. 3) results by the path manager 340. Note that the strength and offset associated with the paths in the potential set 445 and the temporary set 465 may have been filtered. A discussion on strength and offset filtering will be presented below.

Figure 5:
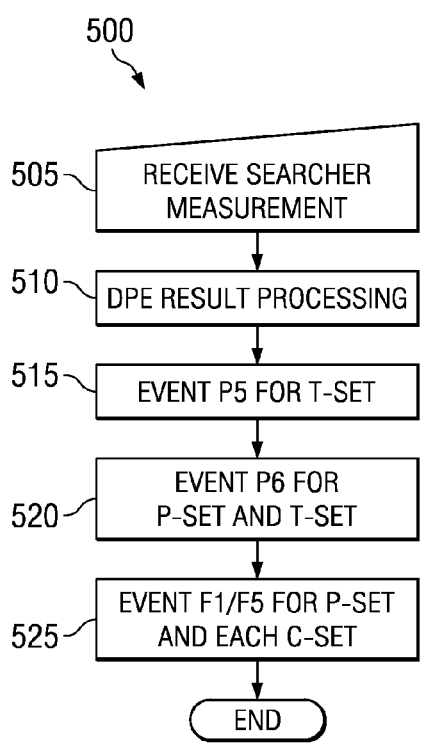
FIG. 5 is a diagram of a sequence of operations by a path manager, according to a preferred embodiment of the present invention.

With reference now to FIG. 5, there is shown a diagram illustrating a sequence of operations 500 by a path manager, according to a preferred embodiment of the present invention. According to a preferred embodiment of the present invention, a path manager, such as the path manager 340 (FIG. 3), can be responsible for receiving searcher measurements from the path searcher 310 (FIG. 3), processing the searcher measurements, and storing the processed measurements in path data structures 330 (FIG. 3). Processing of the searcher measurements can include path identification, filtering path offset and strength, path event evaluation, and so forth.

The path manager 340 can begin when it receives searcher results from the path searcher 310 (block 505). As discussed above, the path searcher 310 can provide a delay profile of the received signal to the path manager 340. After receiving the searcher measurements, the path manager 340 can begin processing (block 510). This can also be referred to as DPE (delay profile estimate) result processing.

Figure 6A:
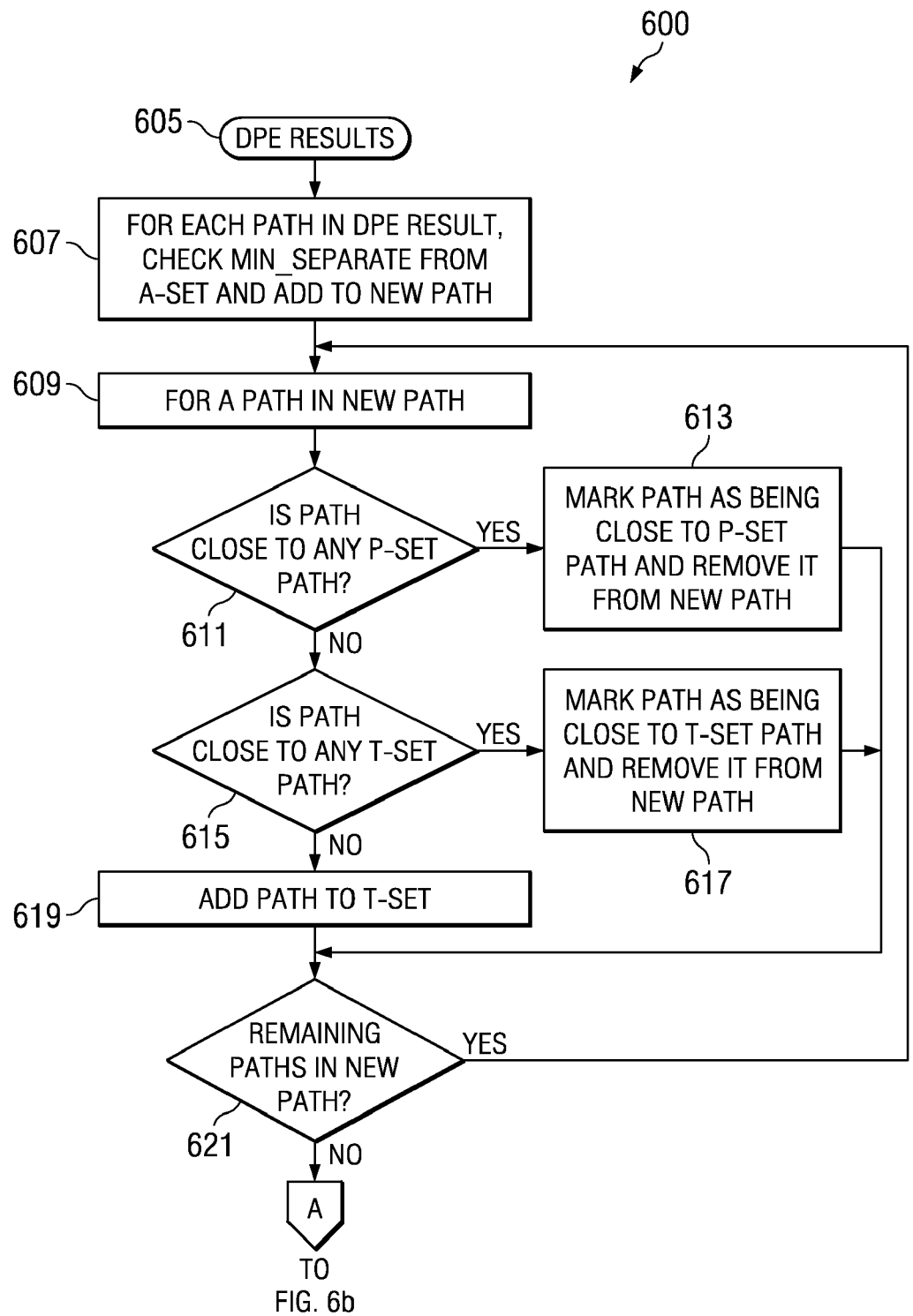
FIGS. 6a through 6c are diagrams of DPE result processing, according to a preferred embodiment of the present invention.
Figure 6B:
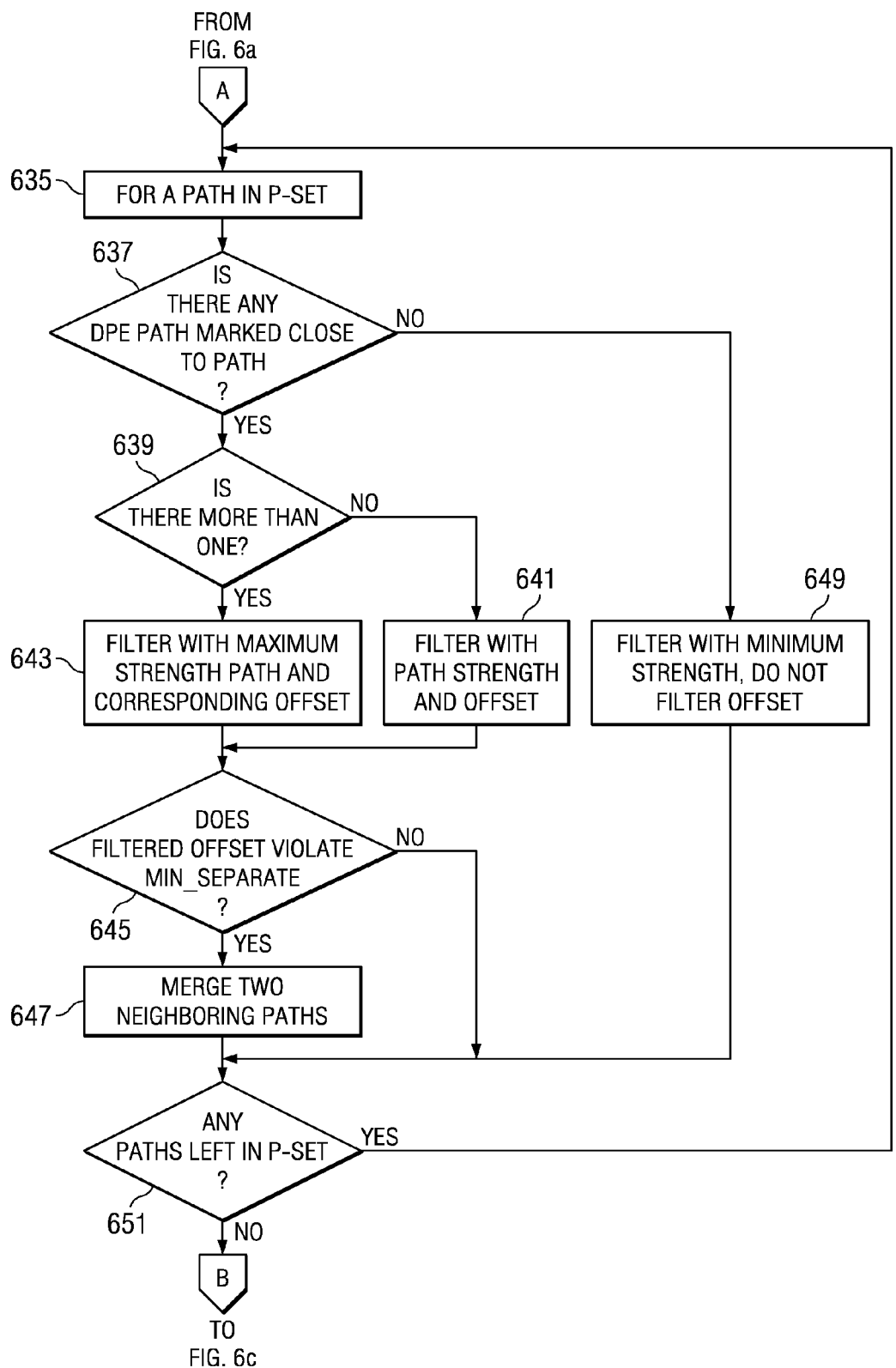
Figure 6C:
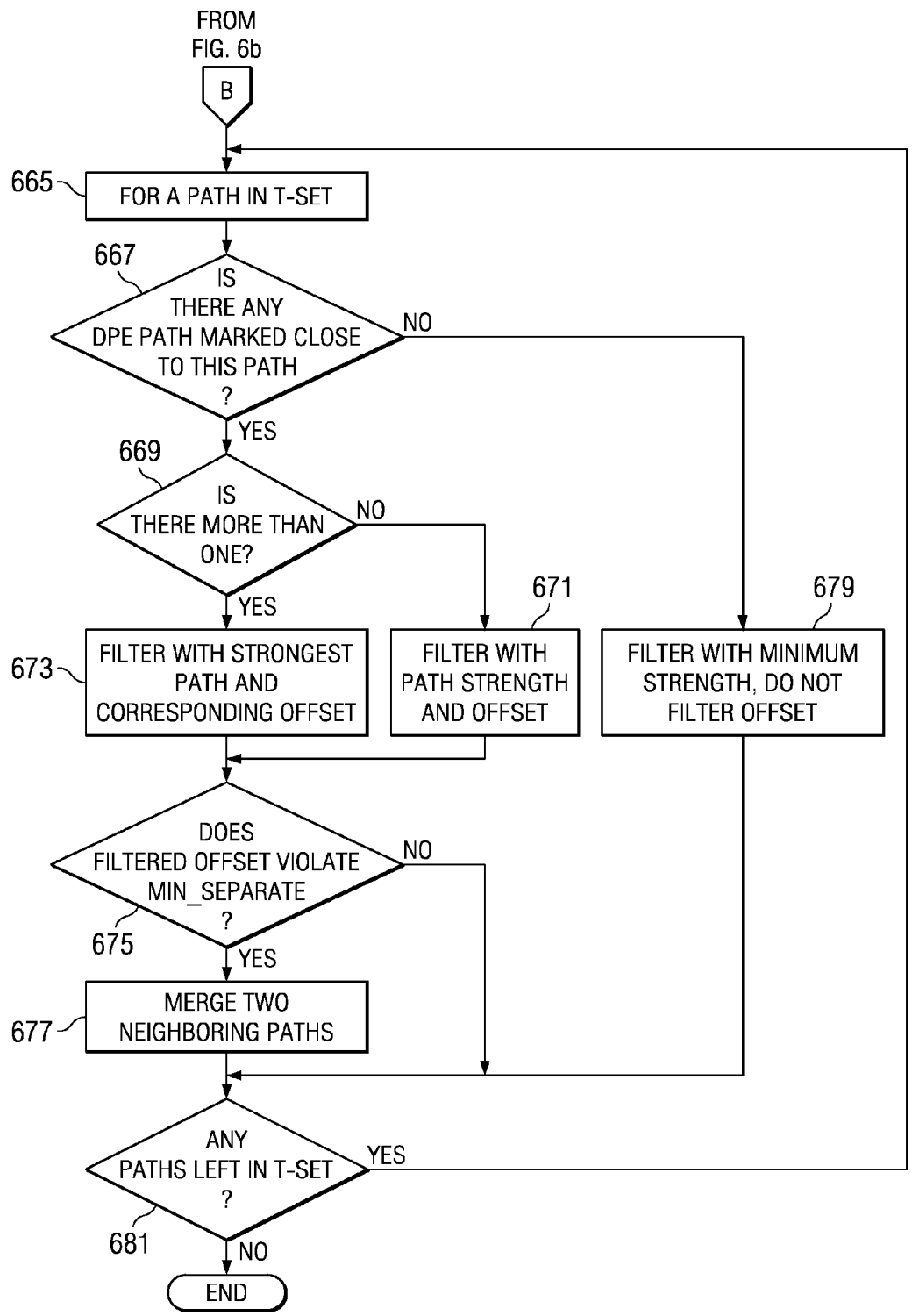

With reference now to FIGS. 6a through 6c, there is shown a series of diagrams illustrating searcher measurement processing (DPE result processing) by a path manager, according to a preferred embodiment of the present invention. A path manager, such as the path manager 340 (FIG. 3), may commence operation when it receives searcher measurement results (DPE results) from the path searcher 310 (FIG. 3) (block 605). As discussed previously, the path searcher 310 can provide the path manager 340 with a delay profile of the received signal. The path manager 340 can then check to see if any path just provided by the path searcher 310 is "known" (block 607). A path is known (or close to an existing path) if it is within a minimum distance separation, referred to as MIN_SEPARATE, from an existing path in terms of delay offset (or code offset). Initially, the path manager 340 can compare the paths provided by the path searcher 310 with paths in an assigned set (A-set) (block 607). Paths whose code offset difference with existing paths in the A-set is less than MIN_SEPARATE can be discarded, while other paths (paths whose code offset different existing paths is greater than or (equal to) MIN_SEPARATE) can be considered a new path.

The path manager 340 can then enter a processing loop to categorize the paths that have been considered a new path. For a path considered a new path (block 609), the path manager 340 can first check to see if it is close to a path in a potential set (P-set) (block 611). Once again, the path can be close to another path if its delay offset (or code offset) is less than MIN_SEPARATE. If the path is close to a path in the P-set, the path can be marked as being close to a P-set path and may no longer be considered a new path (block 613). If the path is not close to a path in the P-set, the path manager 340 can check to see if it is close to a path in a temporary set (T-set) (block 615). If the path is close to a path in the T-set, the path can be marked as being close to a T-set path and may no longer be considered a new path (block 617). If the path is neither close to a path in the P-set or the T-set, then the path manager 340 can add the path to a temporary set (T-set) (block 619). The path manager 340 can check to see if there remains any path that is considered a new path (block 621). If so, the path manager 340 can return to block 609 to categorize the path.

Continuing at point A in FIG. 6b, the path manager 340 can now enter a processing loop to process paths in the P-set. For a path considered to be in the P-set (block 635), the path manager 340 can first check to see if any path provided by the path searcher 310 is marked as being close to the path (block 637). If there is a path provided by the path searcher 310 (from the DPE results) that is marked as being close to the path, the path manager 340 can then check to see if there is more than one path from the DPE results that is marked close to the path (block 639). If there is only one path from the DPE results that has been marked as being close to the path, then the path manager 340 can filter the path's path strength and delay offset (block 641).

The filtering of the path's path strength and delay offset (block 641) can be performed with a single pole infinite impulse response (IIR) filter. According to a preferred embodiment of the present invention, the IIR filter should have the following behavior (expressed in mathematical form):

$$M_n = (1-a) \cdot M_{n-1} + a \cdot X_n,$$

wherein $M_n$ is the updated filtered measurement result, $M_{n-1}$ is the previous filtered measurement result, $X_n$ is the newest measurement result received from the input, and a is a forgetting factor. In order to initialize the IIR filter, $M_0$ can be set to $X_1$ when the first DPE result from the path searcher 310 is received by the path manager 340.

The forgetting factor, a, may vary according to an amount of time elapsed since the last measurement and may be expressed as an expression:

$$a = 1 - \{1 - \text{FILTER\_COEFFICIENT}\}^{TIME\_FROM\_PREVIOUS\_MEASUREMENT/5},$$

wherein TIME_FROM_PREVIOUS_MEASUREMENT can be an integer value in milliseconds. According to a preferred embodiment of the present invention, the FILTER_COEFFICIENT may vary from a range of 0.65 to 0.75 and an overall delay of the IIR filter should be 250 milliseconds or less to provide a satisfactory level of performance.

If there may be more than one path from the DPE result that has been marked as being close to the existing path (block 639), then the filtering can be performed with a path from those that have been marked as being close to the path whose path strength is largest and its corresponding delay offset (block 643). Note that if more than one path has the largest path strength, then the path manager 340 may select a path with the smallest change in delay offset. Alternatively, the path manager 340 may randomly select a path. As another alternative, the path manager 340 may take a weighted average of those path offsets.

After filtering (block 641 or 643), the path manager 340 may check to see if the filtered delay offset violates the minimum distance separation threshold, MIN_SEPARATE (block 645). If the filtered delay offset of any two paths violates MIN_SEPARATE, meaning that the two filtered paths may be too close together, then the path manager 340 can merge the two paths into one (block 647). The merging may involve the discarding of the path with the smaller path strength, or alternatively, a new path may be created through the use of interpolation to determine a new path strength and delay offset. The path manager 340 can then check to see if there are any remaining paths in the P-set (block 651). If there are, then the path manager 340 can return to block 635.

Referring back to block 637, if there are no paths from the DPE results that have been marked as being close to the path, then the path manager 340 can filter the path with a pre-defined constant called MIN_PATH_STRENGTH but not filter the delay offset (block 649). After the filtering, the path manager 340 can check to see if there are any remaining paths in the P-set (block 651). If there are, then the path manager 340 can return to block 635.

Continuing at point B in FIG. 6c, the path manager 340 can now enter a processing loop to process paths in the T-set. For a path considered to be in the T-set (block 665), the path manager can first check to see if any path provided by the path searcher 310 is marked as being close to the path (block 667). If there is a path provided by the path searcher 310 (from the DPE results) that is marked as being close to the path, the path manager 340 can then check to see if there is more than one path from the DPE results that is marked close to the path (block 669). If there is only one path from the DPE results that is marked close to the path, then the path manager 340 can filter the path's path strength and delay offset (block 671). The filter used by the path manager 340 can be as described previously.

If there may be more than one path from the DPE result that has been marked as being close to the path (block 669), then the filtering can be performed with a path from those that have been marked as being close to the path whose path strength is largest and its corresponding delay offset (block 673). Note that if more than one path has the largest path strength, then the path manager 340 may select a path with the smallest change in delay offset. Alternatively, the path manager 340 may randomly select a path. As another alternative, the path manager 340 may take a weighted average of those path offsets.

After filtering (block 671 or 673), the path manager 340 may check to see if the filtered delay offset violates the minimum distance separation threshold, MIN_SEPARATE (block 675). If the filtered delay offset violates MIN_SEPARATE, meaning that the filtered path and the path may be too close together, then the path manager 340 can merge the two paths into one (block 677). The merging may involve the discarding of the path with the smaller path strength, or alternatively, a new path may be created through the use of interpolation to determine a new path strength and delay offset. The path manager 340 can then check to see if there are any remaining paths in the T-set (block 681). If there are, then the path manager 340 can return to block 665.

Referring back to block 667, if there are no paths from the DPE results that have been marked as being close to the path, then the path manager 340 can filter the path with a pre-defined constant called MIN_PATH_STRENGTH but not filter the delay offset (block 679). After the filtering, the path manager 340 can check to see if there are any remaining paths in the P-set (block 681). If there are, then the path manager 340 can return to block 665. If there are no more remaining paths in the T-set, then the DPE result processing can terminate.

With reference now back to FIG. 5, after the path manager 340 completes DPE result processing (block 510), it can now turn its attention to path event handling. Path event handling can involve either the adding (promotion) or dropping (demotion) of paths in the P-set and T-set. Paths in the T-set can be added to the P-set (block 515) while paths in the T-set and the P-set can be dropped (block 520). According to a preferred embodiment of the present invention, the management of a path (adding or dropping) can make use of several metrics, such as thresholds (for example, path strength measurements), timers (for example, the time_to_drop timer or the time_to_add timer), and hysteresis (for example, a hysteresis on a path strength measurement threshold can help prevent a path from being added and then dropped and then added too frequently).

The addition of a path into the P-set from the T-set (referred to as path event PS), can require that the path meet the following triggering condition: $M_{Temp} \geq T_{path\_add} * H_{P5}$, wherein $M_{Temp}$ is the path strength measurement of the path, $T_{path\_add}$ is the threshold for adding a path, and $H_{P5}$ is the hysteresis value for path event P5, which is preferably greater than or equal to one. So, for path event P5, if the threshold for adding a path, $T_{path\_add}$, divided by the hysteresis value, $H_{P5}$, is less than (or equal to) the path strength measurement for the path, $M_{Temp}$, then the path can qualify for being moved from the T-set to the P-set. If the threshold for adding a path, $T_{path\_add}$, and the hysteresis value, $H_{P5}$, are expressed in dB, then the multiplication can become a simple addition. Note that in addition to meeting the strength triggering condition, there may be timing constraints placed on a path. For example, if the path meets the strength triggering condition, the path may not be added to the P-set until a timer determining when to add a path expires (the value of a time_to_add timer reaches a constant TIME_TO_ADD_PATH, for example). The timer may run as long as the path satisfies the strength triggering condition. Furthermore, if the path meets the triggering condition and the timing condition, it may still not be added to the P-set if it is too close to an existing path in the P-set. If a path meets all of the necessary conditions to be added to the P-set, then the path can be immediately added if there is space in the P-set. However, if the P-set is already full, then the path manager 340 may be required to find the oldest path in the P-set and drop the oldest path. If there may be more than one path in the P-set determined to be the oldest path, then the path manager 340 can select the path with the lowest path strength.

In addition to the triggering condition discussed above, the path event P5 (as well as other path events) can have a leaving triggering condition. When the leaving triggering condition is met, timers associated with the path, such as the time_to_add or the time_to_drop timer, may be reset to zero. For the path event P5, the leaving triggering condition can be expressed as: $M_{Temp} < T_{path\_add}/H_{P5}$. Note that when neither triggering nor leaving triggering conditions are met, the timers can be stopped, i.e., their values do not change. If the threshold for adding a path, $T_{path\_add}$, and the hysteresis value, $H_{P5}$, are expressed in dB, then the multiplication can become a simple addition.

The dropping of a path from either the T-set or the P-set (referred to as path event P6) also has a triggering and a leaving triggering condition. The triggering condition may be expressed as: $M_{Pot} \leq T_{path\_drop}/H_{P6}$, while the leaving triggering condition can be expressed as: $M_{Pot} > T_{path\_drop}*H_{P6}$. With path event P6, if the triggering condition can be continually met until the time_to_drop timer expires, then the path can be dropped.

If a path has extraordinary path strength, then it can be added to the P-set without having to wait until the time_to_add timer expires. This can help accelerate the assignment of a finger to the path. If the path has a path strength exceeding the threshold by a specified margin, then the path can be immediately added to the P-set. The condition for the immediate adding of a path to the P-set can be expressed as: $M_{Temp} \geq T_{path\_add}*(1+\Delta)$, wherein the $\Delta$ may be referred to as a bias factor varying over time and can be expressed as:

$$\Delta = \text{BIAS\_PATH\_ADD} * \text{timer\_path\_add}/\text{TIME\_TO\_ADD\_PATH}$$

where BIAS_PATH_ADD is a constant value and timer_path_add is the value of the time_to_add timer. The bias factor can therefore change based upon how close to expiration the timer value is. According to a preferred embodiment of the present invention, the bias factor can decrease as the amount of time spent in monitoring a path increases.

Note that historical information regarding the paths (stored in the path data structure 330 (FIG. 3)) can be used to make adjustments in the values of the thresholds, hysteresis, timers, and so forth. For example, if historically, a path at a certain delay offset has proven to provide a large contribution to the quality of the received signal when demodulated, a threshold may be set lower for future paths at that certain delay offset to make it easier for that path to be assigned to a demodulating finger.

Certain path management operations can have an effect upon the fingers of the rake receiver 315 (FIG. 3). For example, the assignment of paths to specific fingers (the A-set) will inevitably require interaction between the path manager 340 and the finger manager 345. The next operation of the path manager 340, block 425, involves promoting paths to the A-set (from the P-set) and manipulating pointers in the C-set.

The promotion of paths to the A-set from the P-set and the manipulation of pointers in the C-set (block 525) can make use of two finger events, F1 and F5. Both finger events F1 and F5 involve an upgrade in the status of a path. Both events can be used or only one of the two events can be used. The finger events F1 and F5 come into play when there may be an available finger (i.e., a finger to which no path is assigned for the CCTRCH) and a potential path or an assigned path (to which no finger is assigned for this CCTRCH) meets a triggering condition during the time_to_add finger timer. When the finger event F1 is triggered, a potential path may have become relatively beneficial to assign a finger to and when the trigger event F5 is triggered, a potential path may have exceeded a pre-defined threshold. Note that the finger events F1 and F5 may be evaluated when there are fingers available for assignment. For the finger events F1 and F5, the triggering event may be expressed as:

$$M_{pot} \geq Q_A * R_{F1} * H_{F1} \text{ (finger event F1)}$$

$$M_{pot} \geq T_{finger\_add} * H_{F5} \text{ (finger event F5)}$$

wherein $M_{pot}$ is the measured path strength, $Q_A$ is the total finger quality, $R_{F1}$ is the relative threshold and may be thought of as a scaling factor, $H_{F1}$ is the hysteresis value for F1, $T_{finger\_add}$ is the threshold for adding a finger for F5, and $H_{F5}$ is the hysteresis value for F5.

Similar to path events P5 and P6, finger events F1 and F5 also have leaving triggering conditions. When the leaving triggering conditions are met, the timers associated with the fingers can be reset to zero. For finger events F1 and F5, the leaving triggering events may be:

$$M_{pot} < Q_A * R_{F1}/H_{F1} \text{ (finger event F1)}$$

$$M_{pot} < T_{finger\_add}/H_{F5} \text{ (finger event F5)}.$$

Figure 7:
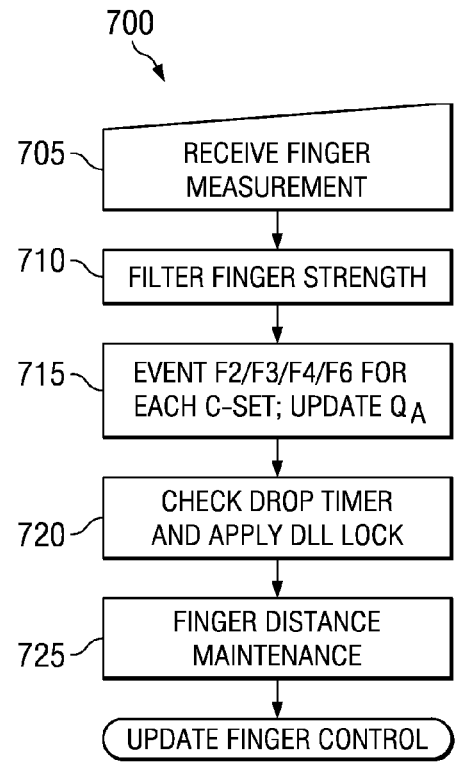
FIG. 7 is a diagram of a sequence of operations by a finger manager, according to a preferred embodiment of the present invention.

With reference now to FIG. 7, there is shown a diagram illustrating a sequence of operations 700 by a finger manager, according to a preferred embodiment of the present invention. According to a preferred embodiment of the present invention, a finger manager, such as the finger manager 345 (FIG. 3), can be responsible for receiving finger measurements from the rake receiver 315 (FIG. 3) and DPE results from the path searcher 310 (FIG. 3), processing the finger measurements, and then storing the processed measurements in the finger data structure 335 (FIG. 3).

The finger manager 345 may begin when it receives finger measurements and DPE results (block 705). The DPE results may be from the path searcher 310 (as described above), while the finger measurements may be in the form of early, on-time, and late sample energies of a path being demodulated by the various fingers in the rake receiver 315. After receiving the finger measurements and the DPE results, the finger manager 345 can filter the finger strength measurements (block 710). According to a preferred embodiment of the present invention, the filtering of the finger strength measurements may be performed by a single pole IIR filter, perhaps similar to the single pole IIR filter described earlier. Note however, that the filtering may be performed with the finger strength measurements and not necessarily with the delay offsets. Additionally, since the finger manager 345 may be periodically and continually receiving the finger strength measurements, the forgetting factor, a, can be a constant value.

After filtering the finger strength measurements (block 710), the finger manager 345 can apply finger events F2, F3, F4, and F6 to the C-set for each cell site (for each CCTRCH) using the filtered finger strength measurements and update finger strength and total finger quality (block 715). Finger event F2 determines if a finger becomes relatively unimportant (when the strength of a path is below the sum of the strength of the already-assigned fingers by more than 10 dB, for example, it may not be noticeably beneficial to assign another finger to this path), finger event F3 determines if a potential path becomes better than a path assigned to a finger, finger event F4 determines if a finger should be denoted the best finger, and finger event F6 determines if a finger drops below a pre-defined threshold and should be dropped. The triggering condition and leaving triggering conditions for the finger events F2, F3, F4, and F6 may be expressed as:

| Event | Triggering Condition | Leaving Triggering Condition |
|---|---|---|
| F2 | $M_{as} \leq Q_A * R_{F2}/H_{F2}$ | $M_{as} > Q_A * R_{F2} * H_{F2}$ |
| F3 | $M_{pot} \geq M_{as} * H_{F3}$ | $M_{pot} < M_{as}/* H_{F3}$ |
| F4 | $M_{NotBest} \geq M_{Best} * H_{F4}$ | None |
| F6 | $M_{as} \leq T_{fingerdrop}/H_{F6}$ | $M_{as} > T_{fingerdrop}*/H_{F6}$. |

After application of the finger events F2, F3, F4, and F6 for each member of the C-set (block 715), the finger manager 345 can check if a drop timer is running for a finger (block 720). If the drop timer is running for a finger, then the finger manager can choose to ignore any corresponding reports from the finger's time-tracking loop or delay lock loop (DLL) (not shown) and not update the finger's delay offset. Based upon the signal being demodulated by the finger, the finger's DLL may report an advance or a retard of the delay offset. If the drop timer is running for the finger, the finger manager 345 may choose to not update the finger's delay offset, regardless of the DLL's report. This can be referred to as DLL lock.

Fingers that are assigned to paths that are close to one another can result in several problems. A first problem may involve the loss of path diversity and a second problem may involve the collapse of chip time tracking. Therefore, to ensure good performance, it may be desired that the fingers are not assigned to paths that may be too close to one another, preferably greater than 0.75*Tc (also referred to as MIN_FINGER_SEPARATE) apart, wherein Tc is the chip time. The finger manager 345 can apply what is referred to as a finger distance maintenance algorithm (block 725).

A short description of the finger distance maintenance algorithm is as follows: 1) Form a finger offset array for all CCTrCHs having radio links to a cell; 2) Calculate a temporary delay offset array by adjusting each element of an old finger delay offset array according to individual DLL decisions (advance, retard, stay as reported by rake receiver control). Sort the temporary delay offset delay; 3) Calculate the distance between adjacent fingers from the temporary delay offset array and compare them with MIN_FINGER_SEPARATE. If the distance between two adjacent fingers is less than MIN_FINGER_SEPARATE, the two fingers can be placed in a group. Based on the decisions, divide the fingers into groups, else go to 7); 4) For each group, determine the group decision. The group decision is the decision of the strongest finger in the group based on filtered finger strength. Calculate a new delay offset of all the fingers in each group according to the group decision; 5) Rearrange the finger delay offsets such that all the fingers in the group are separated by MIN_FINGER_SEPARATE; 6) Update the temporary delay offset array and go to 3); 7) Update a LONG_CODE_OFFSET of the A-set. A detailed discussion of the finger distance maintenance algorithm can be found in a co-assigned and co-pending patent application entitled "Group Decision Rule in Code Tracking Using a Delay Lock Loop (DLL)," filed Oct. 31, 2003, Ser. No. XX/XXX,XXX.

After application of the finger distance maintenance algorithm, the finger control 345 can inform rake receiver control (not shown) of decisions that it has made, such as assign/de-assign/re-assign) plus the timing updates made as a result of the finger distance maintenance algorithm and any new finger task information.

Figure 8:
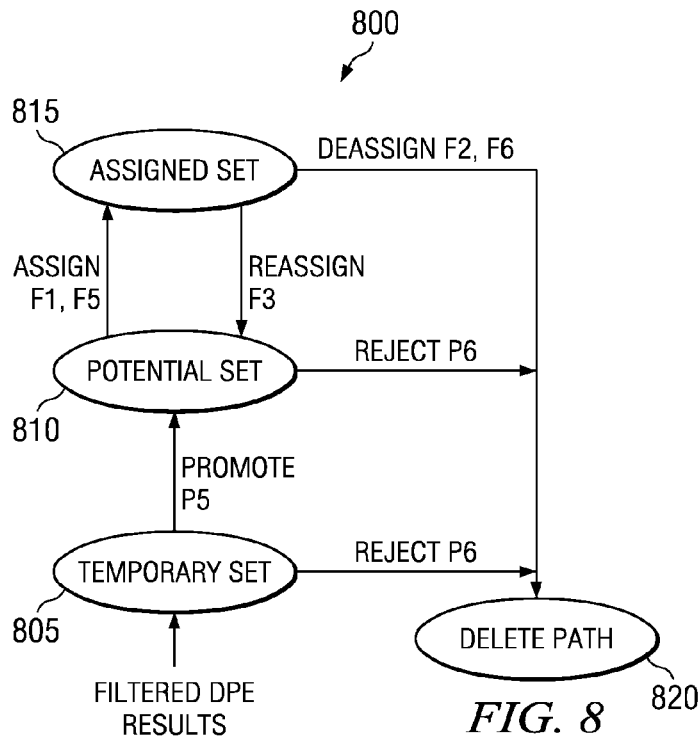
FIG. 8 is a state diagram for a path, according to a preferred embodiment of the present invention.

With reference now to FIG. 8, there is shown a diagram illustrating a state diagram 800 for a path, according to a preferred embodiment of the present invention. There may be four states in the state diagram 800: a temporary set state 805, a potential set state 810, an assigned set state 815, and a delete path state 820. The states in the state diagram 800 may be reachable by a path after it has been filtered by the path manager 340.

After being filtered by the path manager 340, the filtered path may be able to reach the temporary set state 805 if there are no other paths in the A-set, P-set, or T-set that is close to the filtered path. Once in the temporary set state 805, the filtered path may be promoted to the potential set state 810 via a path event F5, if the filtered path meets the triggering condition for the path event F5 ($M_{Temp} \geq T_{path\_add} * H_{P5}$). If the filtered path meets the triggering condition and timers associated with the filtered path also meet requirements, then the filtered path can be promoted to the potential set state 810.

Once in the potential set state 810, the filtered path can be moved to the assigned set state 815. In order to be moved to the assigned set state 815, the filtered path may need to be assigned to a finger of the rake receiver 315. To be assigned, the filtered path may need to meet the triggering conditions of either the finger event F1 or the finger event F5. Once again, timers associated with the filtered event must also meet requirements. Once in the assigned set state 815, the filtered path may return to the potential set 810 if it needs to be reassigned (finger event F3 ($M_{pot} \geq M_{as} * H_{F3}$)).

While the filtered path is in either the temporary set state 805, potential set state 810, or the assigned set state 815, it can be moved to the delete path state 820 if it meets triggering condition of the path event P6 ($M_{Pot} \leq T_{path\_drop}/H_{P6}$) or the finger events F2 ($M_{as} \leq Q_A * R_{F2}/H_{F2}$) and F6 ($M_{as} \leq T_{fingerdrop}/H_{F6}$) Once the filtered path is in the delete path state 820, it can be discarded.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving a delay profile;

processing paths from the delay profile, wherein the processing comprises;

placing paths with a delay offset greater than a specified threshold from the delay offset of paths in a first set into a group;

removing paths from the group if the path's delay offset is less than the specified threshold from delay offsets of a path in a second or a third set; and adding paths from the group to the third set if the path's delay offset is greater than the specified threshold from the delay offset of a path in the second and third sets;

placing the processed paths into a plurality of sets based on path criteria; and assigning the placed processed paths to demodulating fingers.

2. The method of claim 1, wherein the path criteria includes path signal quality and age of path.

3. The method of claim 2, wherein the path criteria further includes a hysteresis on the path signal quality.

4. The method of claim 2, wherein the path criteria further includes historical information regarding paths at different delay offsets.

5. The method of claim 4, wherein the historical information can affect the placement of the processed paths into the plurality of sets and the values of path strength, age of path, and hysteresis used in the placing.

6. The method of claim 1, wherein the delay profile is provided by a path searcher.

7. The method of claim 1, wherein the processing further comprises:
filtering paths in the second and third sets.

8. The method of claim 7, wherein the first set contains paths currently assigned to demodulating fingers, the second set contains paths of sufficient quality to be assigned to demodulating fingers, and the third set contains paths from processing of the delay profile.

9. The method of claim 7, wherein paths are added to the third set if the path's delay offset is greater than or equal to the specified threshold from the delay offset of paths in the second and third sets.

10. The method of claim 7, wherein the removing comprises:
marking the path as being close to a path in the second or third sets; and
deleting the path from the group.

11. The method of claim 7, wherein if a path is removed from the group, then the path is marked as being close to a path in the second or third sets, and wherein the filtering comprises:
for a path in the second or third set,
a) determining if there is a removed path marked as being close to the path;
b) filtering the path and its delay offset if there is a removed path marked as being close to the path; and
c) filtering the path if there is not a removed path marked as being close to the path.

12. The method of claim 11, wherein the b) filtering comprises filtering with a maximum strength path and its delay offset if there is more than one removed path marked as being close to the path.

13. The method of claim 11, wherein the filtering further comprises after the b) filtering, merging paths if their filtered delay offsets are less than a specified threshold apart.

14. The method of claim 11, wherein the a) determining, b) filtering, and c) filtering is repeated for each path in the second and third sets.

15. The method of claim 11, wherein the b) filtering and c) filtering makes use of an infinite impulse response (IIR) filter.

16. The method of claim 15, wherein the IIR filter has the form:

$$M_n = (1-a) \cdot M_{n-1} + a \cdot X_n,$$

wherein $M_n$ is the updated filtered measurement result, $M_{n-1}$ is the previous filtered measurement result, $X_n$ is the newest measurement result received from the input, and a is a forgetting factor expressible as $a = 1 - \{1-\text{FILTER\_COEFFICIENT}\}^{\text{TIME\_FROM\_PREVIOUS\_MEASUREMENT}/5}$, where TIME_FROM_PREVIOUS_MEASUREMENT can be an integer value in milliseconds.

17. The method of claim 15, wherein the IIR filter has an overall delay of less than 250 milliseconds.

18. The method of claim 1, wherein a first set contains paths currently assigned to demodulating fingers, a second set contains paths of sufficient quality to be assigned to demodulating fingers, and a third set contains paths from processing of the delay profile, and wherein the placing comprises:
promoting paths from the third set to the second set based on path criteria; and
removing paths from the second and the third set based on path criteria.

19. The method of claim 18, wherein a path is removed if its path strength meets a triggering condition for a specified amount of time, wherein the triggering condition is expressible as: $M_{Pot} \leq T_{path\_drop}/H_{P6}$, wherein $T_{path\_drop}$ is a threshold for adding a path, and $H_{P6}$ is a hysteresis value.

20. The method of claim 19, wherein the specified amount of time is provided by a second timer, wherein the second timer for the path is initialized when the path is placed in the third set or the second set, wherein the timer decrements while the path strength of the path meets the triggering condition, and wherein the timer is disabled when a leaving triggering condition is met, with the leaving triggering condition is expressible as: $M_{Pot} > T_{path\_drop} * H_{P6}$.

21. The method of claim 18, wherein a path is promoted if its path strength exceeds a triggering condition by a specified margin, wherein the triggering condition is expressible as: $M_{Temp} \geq T_{path\_add} * (1+\Delta)$, wherein $T_{path\_add}$ is a threshold for adding a path and $\Delta$ may be referred to as a bias factor and can be expressed as $$\Delta = \text{BIAS\_PATH\_ADD} * \text{timer\_path\_add}/\text{TIME\_TO\_ADD\_PATH}.$$

22. The method of claim 1, wherein a first set contains paths currently assigned to demodulating fingers, a second set contains paths of sufficient quality to be assigned to demodulating fingers, and a third set contains paths from processing of the delay profile, and wherein the assigning comprises:
if a demodulating finger is available,
determining if a path in the second set is usable;
determining if a path in the second set exceeds an add threshold; and
assigning the path exceeding the add threshold to the demodulating finger.

23. The method of claim 22, wherein the first determining comprises comparing a path's path strength with a triggering condition, wherein the triggering condition can be expressible as: $M_{pot} \geq Q_A * R_{F1} * H_{F1}$, wherein $Q_A$ is the finger quality, $R_{F1}$ is the relative threshold and may be thought of as a scaling factor, and $H_{F1}$ is the hysteresis value for F1.

24. The method of claim 22, wherein the first determining comprises comparing a path's path strength with a triggering condition, wherein the triggering condition can be expressible as: $M_{pot} \geq T_{finger\_add} * H_{F5}$, wherein $T_{finger\_add}$ is the threshold for adding a finger and is the hysteresis value for F5.

25. The method of claim 22, wherein if the number of paths exceeding the add threshold is greater than the number of demodulating fingers available, the paths exceeding the add threshold with the greatest path strengths are assigned to the demodulating fingers.

26. A method comprising:
receiving a delay profile;
processing paths from the delay profile;
placing the processed paths into a plurality of sets based on path criteria; and
assigning the placed processed paths to demodulating fingers; wherein there are four sets: an assigned set, a potential set, a temporary set, and a code set, wherein the assigned set contains paths that are assigned to fingers for one or more communications channels, wherein the potential set contains paths of sufficient strength and can be assigned to fingers, wherein the temporary set contains paths after processing of the delay profile, and wherein the code set contains paths that are assigned to a finger for use in demodulating communications channels.

27. A method comprising:
receiving a delay profile;
processing paths from the delay profile;
placing the processed paths into a plurality of sets based on path criteria; and
assigning the placed processed paths to demodulating fingers;
wherein a first set contains paths currently assigned to demodulating fingers, a second set contains paths of sufficient quality to be assigned to demodulating fingers, and a third set contains paths from processing of the delay profile, and wherein the placing comprises:
promoting paths from the third set to the second set based on path criteria; and
removing paths from the second and the thired set based on path criteria; and
wherein a path is promoted if its path strength meets a triggering condition for a specified amount of time, wherein the triggering condition is expressible as: $M_{Temp} \geq T_{path\_add} * H_{P5}$, is a threshold for adding a path and $H_{P5}$ is a hysteresis value.

28. The method of claim 27, wherein the specified amount of time is provided by a timer, wherein the timer for the path is initialized when the path is placed in the third set, wherein the timer decrements while the path strength of the path meets the triggering condition, and wherein the timer is disabled when a leaving triggering condition is met, with the leaving triggering condition is expressible as: $M_{Temp} < T_{path\_add}/H_{P5}$.

29. A method comprising:
receiving demodulating finger strength measurements;
filtering the demodulating finger strength measurements;
processing demodulating finger assignments;
checking drop timers for the demodulating finger assignments; and
ensuring demodulating finger separation.

30. The method of claim 29, wherein the demodulating finger strength measurements are provided by a rake receiver controller.

31. The method of claim 29, wherein the filtering comprises filtering the demodulating finger strength measurements with an infinite impulse response (IIR) filter.

32. The method of claim 31, wherein the IIR filter is a single pole filter.

33. The method of claim 29, wherein the processing comprises:
for each demodulating finger assignment,
determining if a demodulating finger has become unusable;
determining if a demodulating finger is better than a best demodulating finger;
determining if a demodulating finger should be dropped; and
for unassigned paths with sufficient path strength,
determining if the unassigned path should be assigned to a demodulating finger.

34. The method of claim 33, wherein the demodulating finger has become unusable if its strength passes a triggering condition expressible as: $M_{as} \leq Q_A * R_{F2}/H_{F2}$, wherein $Q_A$ is the finger quality, $R_{F2}$ is the relative threshold and may be thought of as a scaling factor, and $H_{F2}$ is the hysteresis value.

35. The method of claim 33, wherein the demodulating finger is better than the best demodulating finger if its strength passes a triggering condition expressible as: $M_{NotBest} \geq M_{Best} * H_{F4}$, wherein $M_{Best}$ is the strength of the best demodulating finger and $H_{F4}$ is the hysteresis value.

36. The method of claim 33, wherein the demodulating finger should be dropped if its strength passes a triggering condition expressible as: $M_{as} \leq T_{fingerdrop}/H_{F6}$, wherein $T_{fingerdrop}$ is the threshold for dropping a demodulating finger assignment and $H_{F6}$ is the hysteresis value.

37. The method of claim 33, wherein the unassigned path should be assigned to a demodulating finger if its strength passes a triggering condition expressible as: $M_{pot} \geq M_{as} * H_{F3}$, wherein $M_{as}$ is the strength of a path assigned to a demodulating finger with lowest strength and $H_{F3}$ is the hysteresis value.

38. The method of claim 29 further comprising after the checking, ignoring a delay lock loop report for a demodulating finger if the demodulating finger has a running drop timer.

39. A receiver comprising:
a path searcher coupled to a signal input, the path searcher containing circuitry to provide a delay profile for a received signal from the signal input;
a rake receiver coupled to the signal input, the rake receiver containing circuitry to demodulate the received signal at specified delay offsets and to combine demodulated signals at various offsets into a single received signal;
a resource manager coupled to the path searcher and the rake receiver, the resource manager to assign demodulating fingers in the rake receiver to demodulate specific paths based on information from the delay profile and to update the demodulating finger assignments when changes in the specific paths are detected; and
a path manager coupled to the path searcher, the path manager to place the specific paths into sets based on path criteria,
wherein there are four sets: an assigned set, a potential set, a temporary set, and a code set, wherein the assigned set contains paths that are assigned to fingers for one or more communications channels, wherein the potential set contains paths of sufficient strength and can be assigned to fingers, wherein the temporary set contains paths after processing of the delay profile, and wherein the code set contains paths that are assigned to a finger for use in demodulating communications channels.

40. The receiver of claim 39, wherein the resource manager comprises:
a path data structure coupled to the path manager, the path data structure to store information about the specific paths from the delay profile;
a finger manager coupled to the rake receiver, the finger manager to assign the specific paths to demodulating fingers and to update the assignments as changes in the specific paths are detected; and
a finger data structure coupled to the finger manager, the finger data structure to store information about the demodulating finger assignments.

41. The receiver of claim 40, wherein the path data structure and the finger data structure are memories.

42. The receiver of claim 40, wherein the path manager and the finger manager are application programs.

43. The receiver of claim 39, wherein the receiver is part of a wireless device operating in a wireless communications system.

44. The receiver of claim 43, wherein the wireless communications system uses code-division multiple access spread spectrum.

45. The receiver of claim 44, wherein the wireless communications system is CDMA2000 compliant.

* * * * *